US012792740B2

(12) United States Patent
Kacker et al.

(10) Patent No.: US 12,792,740 B2
(45) Date of Patent: Nov. 10, 2026

(54) IoT/IoMT SOFTWARE MANAGEMENT FRAMEWORK WITH BUILT-IN PERFORMANCE AND SECURITY/VULNERABILITY ALERTS

(71) Applicant: Dell Products L.P., Round Rock, TX (US)

(72) Inventors: Shamik Kacker, Austin, TX (US); Bijan Kumar Mohanty, Austin, TX (US); Hung Dinh, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 161 days.

(21) Appl. No.: 18/365,495

(22) Filed: Aug. 4, 2023

(65) Prior Publication Data

US 2025/0045416 A1 Feb. 6, 2025

(51) Int. Cl.
*G06F 21/57* (2013.01)
*G16Y 40/50* (2020.01)

(52) U.S. Cl.
CPC ............ *G06F 21/577* (2013.01); *G16Y 40/50* (2020.01)

(58) Field of Classification Search
None
See application file for complete search history.

(56) References Cited

U.S. PATENT DOCUMENTS 11,415,425 B1 * 8/2022 Merchant ................ H04L 41/16
2023/0153460 A1 * 5/2023 Song ................... G06F 21/6245 726/26
2023/0161662 A1 * 5/2023 Wollny ................. G06F 11/004 714/48
2023/0394140 A1 * 12/2023 Orlando ................ G06F 21/554
(Continued)

FOREIGN PATENT DOCUMENTS

WO WO-2019134987 A1 * 7/2019 ............. G06N 3/045

OTHER PUBLICATIONS

Scikit Learn: Train_test_split, https://scikit-learn.org/stable/modules/generated/sklearn.model_selection.train_test_split.html#sklearn.model_selection.train_test_split, Feb. 11, 2022.
(Continued)

*Primary Examiner* — Chris Parry
*Assistant Examiner* — Abderrahmen Chouat
(74) *Attorney, Agent, or Firm* — Workman Nydegger

(57) ABSTRACT

One example method includes pre-processing a dataset, wherein the dataset includes data and/or metadata that indicates a software configuration of an internet of things (IoT) device, and/or indicates a history of any performance issues and/or security issues experienced by the IoT device, after the dataset is pre-processed, providing the dataset as an input to a machine learning model, using the machine learning model to generate, based on the input, respective target variable value predictions for each target variable in a group of target variables, and a first one of the target variables corresponds to the software configuration, and a
(Continued)

second one of the target variables corresponds to the history, and when the target variable value predictions indicate a potential security issue and/or a potential performance issue, with the IoT device, taking a remedial action to resolve the potential security issue and/or the potential performance issue.

20 Claims, 11 Drawing Sheets

(56) References Cited

U.S. PATENT DOCUMENTS

2023/0409715 A1* 12/2023 Nissim ................ G06F 9/45533

OTHER PUBLICATIONS

Scikit-Learn: MultiLabelBinarizer, https://scikit-learn.org/stable/modules/generated/sklearn.preprocessing.MultiLabelBinarizer.html, Feb. 11, 2022.

ScikitLearn: LabelEncoder, https://scikit-learn.org/stable/modules/generated/sklearn.preprocessing.LabelEncoder.html, Feb. 11, 2022.

* cited by examiner

200

MULTIPLE TARGETS

| IoT DEVICE ID | TYPE OF DEVICE | PRIORITY | INSTALLED LOCATION | REGION | SOFTWARE CONFIGURATIONS USED | PERFOR-MANCE ISSUES (?) | SECU-RITY ISSUES (?) |
|---|---|---|---|---|---|---|---|
| 123ABC45 | HOME | LOW | INSIDE | AMER | TIZEN 5.7, SECURITY PATCH 3.1 | YES | NO |
| 245XYZ76 | INDUSTRIAL SENSORS | MEDIUM | OUTSIDE | EMEA | WINDOWS 10 IoT VERSION 7.5, SECURITY PATH 2.3.5 | NO | NO |
| 678HGK23 | INDUSTRIAL ROBOTS | HIGH | INSIDE | APJ | NUCLEUS RTOS VERSION 3.5, SECURITY PATCH 3.8.3 | NO | YES |
| 234KLM32 | HEALTHCARE | HIGH | INSIDE | AMER | WINDOWS 10 IoT VERSION 7.7, SECURITY PATH 2.3.7 | YES | YES |
| 789FLL27 | CONNECTED | MEDIUM | OUTSIDE | EMEA | TINYOS 2.8, SECURITY PATCH 2.6 | YES | NO |

FIG. 2

500

```
%matplotlib inline
import pandas as pd
import numpy as np
import matplotlib.pyplot as plt
import seaborn as sns
from sklearn.model_selection import train_test_split
from sklearn.multioutput import MultiOutputClassifier
from sklearn.preprocessing import MultiLabelBinarizer
```

```
# reading the historical data file into pandas dataframe
software_df = pd.read_csv("IOT_software_composition.csv")  # Read the historical IOT software composition data
```

```
software_df.head()
```

| | device_id | device_type | priority | installed_location | region | software_library | perf_error | security_error |
|---|---|---|---|---|---|---|---|---|
| 0 | 123ABC45 | home | low | inside | AMER | [Tizen 5_7, security patch 3.1] | Y | N |
| 1 | 245XYZ76 | industrial sensors | medium | outside | EMEA | [Nucleus RTOS version 3.5, security patch 3.8.3] | N | N |
| 2 | 678HGK23 | industrial robots | high | inside | APJ | [Windows10 IoT version7.5, security path 2.3.5] | N | Y |
| 3 | 234KLM32 | health care | high | inside | AMER | [Windows10 IoT version7.7, security path 2.3.7] | N | N |
| 4 | 789FLL27 | connected | medium | inside | EMEA | [TinyOS 2.8, security patch 2.6] | Y | Y |

502

FIG. 5

600

```
mlb = MultiLabelBinarizer()
software_df = software_df.join(pd.DataFrame(mlb.fit_transform(software_df.pop('software_library')),
                         columns=mlb.classes_,
                         index=software_df.index))
software_df
```

602

| | device_id | device_type | priority | installed_location | region | Nucleus RTOS version 1.7 | Nucleus RTOS version 2.7 | Nucleus RTOS version 3.5 | TinyOS 1.5 | TinyOS 2.8 | ... | security patch 2.2 | security patch 2.5.3 | security patch 2.6 | security patch 2.6.1 |
|---|---|---|---|---|---|---|---|---|---|---|---|---|---|---|---|
| 0 | 123ABC45 | home | low | inside | AMEA | 0 | 0 | 0 | 0 | 0 | ... | 0 | 0 | 0 | 0 |
| 1 | 245XYZ76 | industrial sensors | medium | outside | EMEA | 0 | 0 | 1 | 0 | 0 | ... | 0 | 0 | 0 | 0 |
| 2 | 678HGK23 | industrial robots | high | inside | APJ | 0 | 0 | 0 | 0 | 0 | ... | 0 | 0 | 0 | 0 |
| 3 | 234KLM32 | health care | high | inside | AMER | 0 | 0 | 0 | 0 | 0 | ... | 0 | 0 | 0 | 0 |
| 4 | 789FLL27 | connected | medium | inside | EMEA | 0 | 0 | 0 | 0 | 1 | ... | 0 | 0 | 1 | 0 |
| 5 | 234ABC78 | home | low | inside | APJ | 0 | 0 | 0 | 0 | 0 | ... | 0 | 0 | 0 | 0 |
| 6 | 267XYZ92 | industrial sensors | medium | outside | AMER | 0 | 1 | 0 | 0 | 0 | ... | 0 | 0 | 0 | 1 |
| 7 | 323HGK49 | industrial robots | high | inside | EMEA | 0 | 0 | 0 | 0 | 0 | ... | 0 | 0 | 0 | 0 |

FIG. 6

700

```
# Encode the categorical values by using Label Encoding
from sklearn.preprocessing import LabelEncoder

software_df['device_type'] = LabelEncoder().fit_transform(software_df['device_type'])
software_df['priority'] = LabelEncoder().fit_transform(software_df['priority'])
software_df['installed_location'] = LabelEncoder().fit_transform(software_df['installed_location'])
software_df['region'] = LabelEncoder().fit_transform(software_df['region'])
software_df['perf_error'] = LabelEncoder().fit_transform(software_df['perf_error'])
software_df['security_error'] = LabelEncoder().fit_transform(software_df['security_error'])
software_df.head()
```

| | device_id | device_type | priority | installed_location | region | Nucleus RTOS version 1.7 | Nucleus RTOS version 2.7 | Nucleus RTOS version 3.5 | TinyOS 1.5 | TinyOS 2.8 | ... | security patch 2.6 | security patch 2.6.1 | security patch 3.1 | security patch 3.8.3 |
|---|---|---|---|---|---|---|---|---|---|---|---|---|---|---|---|
| 0 | 123ABC45 | 2 | 1 | 0 | 0 | 0 | 0 | 0 | 0 | 0 | ... | 0 | 0 | 1 | 0 |
| 1 | 245XYZ76 | 4 | 2 | 1 | 2 | 0 | 0 | 1 | 0 | 0 | ... | 0 | 0 | 0 | 1 |
| 2 | 678HGK23 | 3 | 0 | 0 | 1 | 0 | 0 | 0 | 0 | 0 | ... | 0 | 0 | 0 | 0 |
| 3 | 234KLM32 | 1 | 0 | 0 | 0 | 0 | 0 | 0 | 0 | 0 | ... | 0 | 0 | 0 | 0 |
| 4 | 789FLL27 | 0 | 2 | 0 | 2 | 0 | 0 | 0 | 0 | 1 | ... | 1 | 0 | 0 | 0 |

702

FIG. 7

800

```
# Split Train and Test data sets
#First get the independent variables and dependent variable separated
features = [col for col in software_df.columns if col != 'perf_error' and col != 'security_error']

X_train, X_test, y_train, y_test = train_test_split(software_df[features], software_df[['perf_error', 'security_error']],
                                                    test_size=.3, random_state=42)
```

FIG. 8

900

```
# Using TensorFlow Keras to create the Dense Neural Network model for multi-output classifications
# for perf and security error

import tensorflow.keras as keras
from tensorflow.keras.layers import Dense

input_layer = keras.Input(shape=20, name="input_layer")

dense_1 = keras.layers.Dense(20, name = 'dense_1')(input_layer)
dense_2 = keras.layers.Dense(20, name = 'dense_2')(dense_1)

classification1_output = keras.layers.Dense(1, activation = 'sigmoid', name = "classification1_output')(dense_2)
classification2_output = keras.layers.Dense(1, activation = 'sigmoid', name = "classification2_output')(dense_2)

model = keras.Model(inputs=input_layer,outputs=[classification1_output, classification2_output])
```

FIG. 9

1000

```
model. compile(
    optimizer="adam",
    loss=[
        keras.losses.BinaryCrossentropy(),
        keras.losses.BinaryCrossentropy(),
    ])
```

```
model.fit(x_train,
    {"classification1_output": y_train['perf_error'], "classification2_output": y_train['security_error']},
    epochs=200,
    batch_size=50,
          verbose=1)
```

FIG. 10

1100

```
predictions = model.predict([row])

print(predictions[0])
print(predictions[1])
```

FIG. 11

IoT/IoMT SOFTWARE MANAGEMENT FRAMEWORK WITH BUILT-IN PERFORMANCE AND SECURITY/VULNERABILITY ALERTS

FIELD OF THE INVENTION

Embodiments of the present invention generally relate to security in IoT (internet of things) devices and networks. More particularly, at least some embodiments of the invention relate to systems, hardware, software, computer-readable media, and methods, for implementation and management of security in IoT systems, networks, and devices.

BACKGROUND

There are an estimated 17 billion IoT devices in the world, from printers to garage door openers, thermostats, and security systems, each one packed with software, some of which is open-source, that can be easily hacked. IoT devices are a key entry point for many attacks, according to Microsoft's Digital Defense Report 2022. *"While the security of IT hardware and software has strengthened in recent years, the security of Internet of Things (IoT) has not kept pace*," according to the report. A rash of attacks that reached the physical world through the cyber world in the past year show the rising stakes. For example, within the last year, Toyota stopped operations at one of its plants because of a cyberattack, Ukraine's power grid was targeted, and the Port of London was hit with a cyberattack. These followed major attacks in 2021 on critical infrastructure in the U.S. in which the energy and food supply operations of Colonial Pipeline, and the JBS meatpacking conglomerate, were taken down.

Over the last few years, researchers have found a surprising number of vulnerabilities in seemingly basic code that underpins how devices communicate with the internet. New vulnerabilities are exposing an estimated 100 million devices worldwide, including an array of internet-of-things products and IT management servers. The larger question researchers are scrambling to answer, though, is how to spur substantive changes—and implement effective defenses—as more and more of these types of vulnerabilities pile up. For example, newly disclosed flaws are in four ubiquitous TCP/IP stacks, code that integrates network communication protocols to establish connections between devices and the internet. The vulnerabilities, present in operating systems like the open-source project FreeBSD, as well as Nucleus NET from the industrial control firm Siemens, all relate to how these stacks implement the "*Domain Name System*" internet phone book. These stacks would allow an attacker to either crash a device and take the device offline, or gain control of the device remotely. Both attacks could potentially wreak havoc in a network, especially in critical infrastructure, health care, or manufacturing settings where infiltrating a connected device or IT server can disrupt a whole system or serve as a valuable jumping-off point for burrowing deeper into a victim network.

A majority of the IoT devices have code written with security mentality that is years old. Once the device is connected to the internet, it becomes insecure. This is not surprising, given that the industry has had to rethink how to implement security for general-purpose computers over the past decade.

Recently, IoMT (Internet of Medical Things), which is a collection of medical devices and applications that connect to healthcare IT systems through online computer networks, have exploded in usage numbers. Medical devices are equipped with Wi-Fi allow the machine-to-machine communication that is the basis of IoMT. Examples of IoMT include remote patient monitoring of people with chronic or long-term conditions, tracking patient medication orders and the location of patients admitted to hospitals, and patient wearable mHealth devices, which can send information to caregivers. Infusion pumps that connect to analytics dashboards and hospital beds rigged with sensors that measure the vital signs of patients are medical devices that can be converted to, or deployed as, IoMT technology. The security of sensitive PII (personal identifying information) data—such as protected health information regulated under the Health Insurance Portability and Accountability Act—that passes through the IoMT is a growing concern for healthcare providers.

A growing focus on cars as a particularly important area, and there is a new movement within the software engineering world that is focused on doing a better job of incorporating cybersecurity from the beginning. The concerns about cars are nothing new. In one landmark experiment in 2015, two hackers attacked a Jeep Cherokee and shut down the engine on the highway—the brakes did not respond. Further, the number of IoT devices within homes has exploded in volume. Nearly every electronic devices @home is connected to Wifi/internet.

Large-scale attacks using IoT have already occurred, such as in the form of IoT botnets. In such cases, actors leveraging unpatched vulnerabilities in IoT devices used control of those devices to carry out DOS attacks against many targets. Those vulnerabilities are found regularly in ubiquitous products that are rarely updated. Aside from responding rapidly to attacks, the only answer to the "cat-and-mouse game" is constant innovation. Connected cars usually have SIM cards that hackers can attack via cellular networks. All cars of the same vehicle model use the same software. Once hackers identify a vulnerability, and a way to exploit it remotely, they can replicate the attack on other vehicles. These are just a few examples of IoT security concerns.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIG. 2 discloses a table of example metadata that may be used to train an ML model according to one example embodiment.

FIG. 5 discloses example code for reading a datafile into a dataframe.

FIG. 6 discloses example code for separating and encoding libraries of a dataset. values.

FIG. 7 discloses example code for encoding categorical values as numerical values.

FIG. 8 discloses example code for splitting a dataset.

FIG. 9 discloses example code for creating a dense neural network model for multi-output classifications.

FIG. 10 discloses example code for compiling and training a model.

FIG. 11 discloses example code for predicting target values.

DETAILED DESCRIPTION OF SOME EXAMPLE EMBODIMENTS

Figure 1:
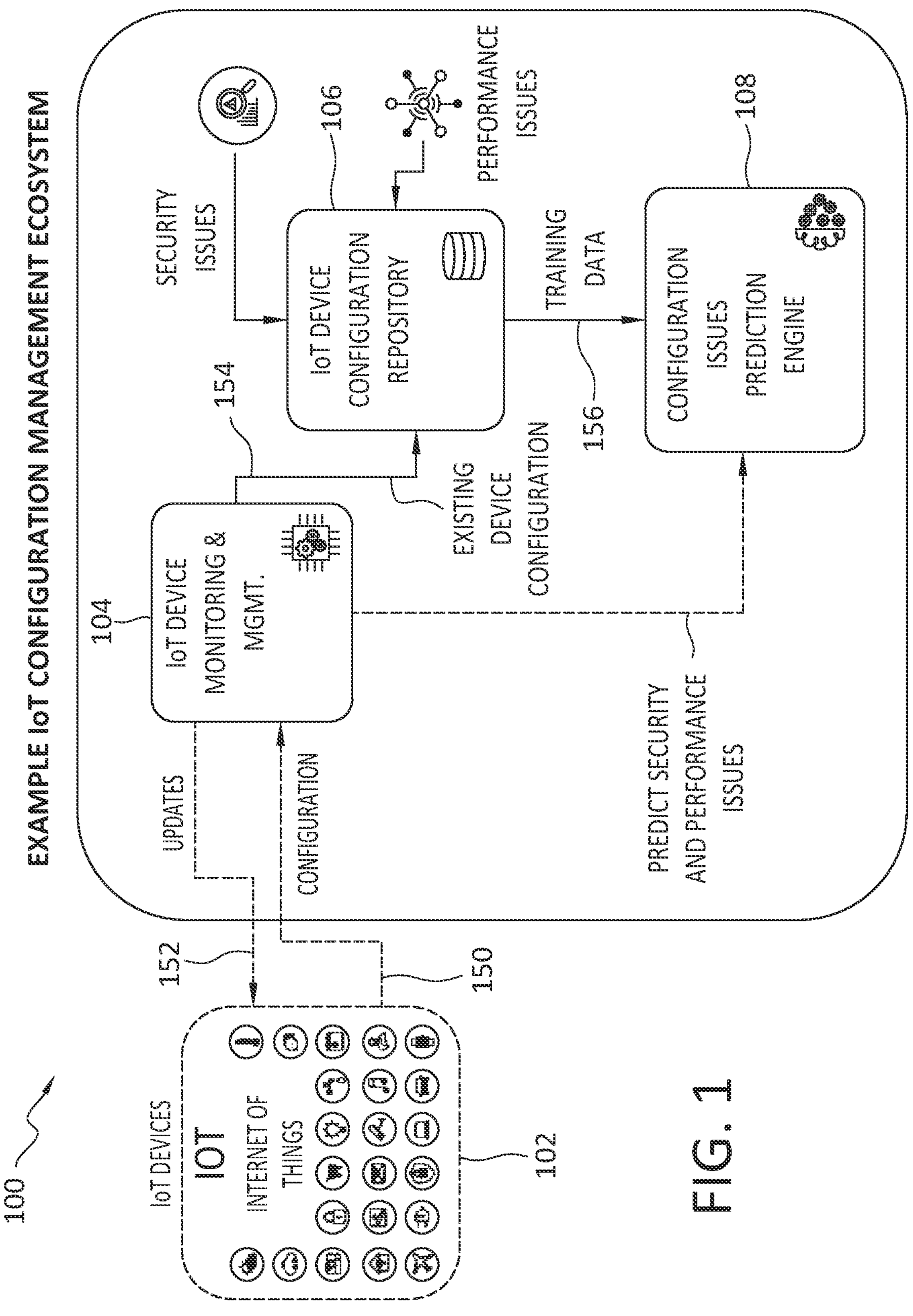
FIG. 1 discloses aspects of a system architecture, and related methods, according to one example embodiment.

Embodiments of the present invention generally relate to security in IoT (internet of things) devices and networks. More particularly, at least some embodiments of the invention relate to systems, hardware, software, computer-readable media, and methods, for implementation and management of security in IoT systems, networks, and devices.

One example embodiment of the invention comprises a framework configured and operable to manage and govern IoTs/IoMTs, and predict any potential performance or vulnerability issues due to the combination of the software components, such as the OS (operating system), and patches, used in that device. By leveraging ML (machine learning) models, and training the ML models using the historical IoT usage data and known security/performance issues, this framework may predict which devices are missing what software, and also identify patches that can prevent these performance and vulnerability issues. This intelligent analysis of software components/libraries of enterprise applications and alerting of potential issues will proactively enable handling them, thus preventing issues in deployment and production.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an example embodiment is that potential security and/or performance concerns with IoT devices may be identified, and resolved, before, and after, deployment of the IoT devices. An embodiment may provide security-based updates to IoT devise. An embodiment may provide management of security for disparate IoT device types in geographically distributed networks. Various other advantages of one or more example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Context for an Example Embodiment

Internet of Things (IoT) refers to a network of devices, appliances, and other objects connected to the internet. These devices can include everything from smart home appliances and wearable devices to industrial machinery and medical equipment. As IoT technology continues to advance, security concerns have become an increasingly important issue.

There are a variety of IoT security concerns that may be addressed by an embodiment of the invention. Following are some examples. One IoT concerns is vulnerabilities in devices. IoT devices often have security vulnerabilities that can be exploited by hackers. This can include everything from weak passwords and unsecured firmware to outdated software and hardware.

Another IoT concern relates to data breaches. IoT devices often collect and transmit sensitive data, such as personal information, financial data, and health data. If this data is not properly secured, it can be intercepted and used by cybercriminals for nefarious purposes.

A further IoT concern relates to botnets. In general, botnets are networks of infected devices that can be used to carry out DDOS (distributed denial-of-service) attacks. IoT devices are particularly vulnerable to botnet attacks because they are often left unsecured and can be easily compromised.

Still another IoT concern stems for a lack of regulation. In particular, the IoT industry is relatively new, and there is a lack of regulatory oversight in many countries. This means that manufacturers may not be held accountable for security vulnerabilities in their IoT products.

Complexity of IoT devices also presents a security concern. IoT devices can be complex and interconnected, making it difficult to identify and address security vulnerabilities. Additionally, many devices are designed to be simple and easy to use, which can lead to a lack of security features.

A subset of IoT is the IoMT (Internet of Medical Things), which refers to a network of medical devices, sensors, and other healthcare-related equipment that are connected to the internet. As with any IoT technology, security concerns are an issue for the IoMT. However, in the case of medical devices, security concerns can have even more significant consequences, as these devices can be responsible for patient care and safety. There are a number of concerns specified to the IoMT space.

One such concern relates to patient privacy. In particular, IoMT devices collect and transmit sensitive patient information, such as medical history, diagnoses, and treatment plans. If this information is not properly secured, it can be accessed by unauthorized users, putting patient privacy at risk.

Another IoMT security concern relates to malware attacks. Specifically, IoMT devices are vulnerable to malware attacks, which can cause the devices to malfunction or compromise their security. This can lead to data breaches or even harm to patients.

A further IoMT concern relates to device hijacking. For example, hackers can gain control of IoMT devices and use them for malicious purposes, such as to launch DDOS attacks or to spread malware.

A lack of encryption is problematic in the IoMT context. For example, many IoMT devices do not use encryption to secure data, rendering the vulnerable to interception and unauthorized access.

A final example concerns outdated software. Many IoMT devices are built on outdated software and operating systems, which may not be supported or updated by the manufacturer. Outdated software can leave the IoMT devices vulnerable to security vulnerabilities and exploits.

Existing IoT/IoMT tools are heavily focused on vulnerabilities management for a particular category. They do not cater to all IoT/IoMT categories, nor do these tools cover both IoTs and IoMTs. Each category is unique in terms of vulnerability management and resolution options. IoT/IoMT issues can lead to performance and scalability issues besides just security issues. All IoT/IoMTs, and other subsets or subcategories of IoTs, have limitations, and embedded devices even more so, which makes mitigating IoT security concerns even more challenging. Examples of embedded devices that may present security concerns in an IoT context, among other, include, but are not limited to, RAM (random access memory) and flash memory, processors and processing speed, power/battery life, interfaces and I/Os (input/output operations), and size of the device.

B. Overview of Aspects of an Example Embodiment

As discussed above, managing and governing IoTs within an enterprise is not an easy task. While enterprises use some tools for scanning the devices, most of the administration, governance and software updates are usually reactive and not fully automatic. Also, the process does not include all software components, OS, patches, or libraries and most importantly the combination of various libraries used in the IoT device that can potentially cause both performance and security issues. Moreover, existing IoT device management tools lack the centralized management and governance of software components, such as OS, patches, and libraries for example, used by each IoT device. Such IoT device management tools do not provide a central repository of all software assets installed in all the IoT devices in an enterprise. This lack of capability is fundamental to the intelligent governance. As well, most IoT devices in an enterprise consist of many software components and libraries, both commercial and open source. Existing IoT device management lacks the intelligence and insight to predict any potential security and vulnerability issues due to the use of a hybrid model that includes a combination of commercial elements and opensource elements. Finally, existing IoT management lacks the intelligence and insight to predict any potential performance issues due to a combination of various patches and libraries in the device.

To address concerns such as those noted above, an embodiment may take a multi-layered approach to IoT security. One example of such an approach may include everything from using strong passwords, and keeping software up to date, to implementing network segmentation and using intrusion detection systems. To an extent, putting controls around the devices so they can only do a specific set of things, may help to mitigate security concerns. That way, the devices cannot be weaponized to launch attacks on other networks, systems, or devices.

In more detail, an example embodiment comprises a comprehensive singular framework for IoT and IoMTs. In an embodiment, the framework may track, for example, not only security concerns, but also IoT/IoMT device warranties, cloud providers, firmware, certifications, document operational dependencies, density of IoT known issues, version release frequency, and latency between issue identification and patch.

An embodiment of the framework may help to create corporate-wide comprehensive IoT policies which may help to dictate IoT types that are acceptable for use. An embodiment of the framework may also help developers decide whether to use individual components or an entire IoT codebase. An embodiment of the framework may help to implement best-in-class security practices which may include, for example, hardware root of trust, secure secrets storage, mutually authentication, encryption of all communication to/from a cloud environment, secure booting, support host processor OTA (over-the-air) updates, governing network segmentation, implementing intrusion detection system, performing security audits and risk assessments, implementing data encryption, and enforcing multi-factor authentication. In an embodiment, the framework may ensure IoT/IoMT security and reliability at scale.

C. Detailed Discussion of Aspects of an Example Embodiment

As illustrated by the discussion herein, it may be important for companies to keep track of IoTs within our ecosystem. Customers are also requesting for IoT security products/tools/libraries used in our product suite and services so they can manage their risk better. Although, as noted herein, there are existing IoT management tools, they are not smart enough to predict any potential security or performance issues due to the combination of various software libraries used in that application.

Thus, an example embodiment of the invention comprises a framework configured and operable to manage and govern IoTs/IoMTs and predict any potential performance or vulnerability issues due to the combination of the software components, such as OS and patches for example, used in that device. By leveraging ML models and training using the historical IoT usage data and security/performance issues, such a framework will predict which devices are missing what software and patches that can prevent these performance and vulnerability issues. This intelligent analysis of software components/libraries of enterprise applications and alerting of potential issues will proactively enable handling them, thus preventing issues in production. Using a framework according to one embodiment of the invention, companies and other entities may benefit by using comprehensive IoT governance to avoid pitfalls associated with vulnerable IoT code.

In more detail, an example embodiment of the invention comprises an approach to manage and govern software components, OS, patches, and libraries for each IoT device in an enterprise, and to leverage ML models to predict potential performance and security issues because of the lack of the right versions of IoT/IoMT device software. An embodiment of the framework system will build and manage a software component repository of each IoT devices in the enterprise. This repository may act as a foundational data store for building intelligent governance of IoT devices. Using ML models and training those models using the software components and versions existing in each IoT device, an embodiment of the invention may predict potential performance and security issues that may arise due to certain software combinations, in an IoT/IoMT device, as a result of uneven software updates in a group of IoT devices, which may number in the millions in some cases.

C.1 Example Embodiment of an End-to-End Architecture

With attention now to FIG. 1, an example architecture according to one embodiment of the invention is denoted at 100. As shown, a population of IoT devices 102, any one or more of which may comprise an IoMT, relate to an IoT device monitoring and management system (IDMMS) 104, which may be hosted in a server on a public cloud or private cloud, and which may operate to monitor and manage the IoT devices 102. All types of configurations and software updates to the IoT devices may be conducted by the IDMMS 104, which may also be for having an accurate view of the existing configuration of each IoT device 102. In general, the IDMMS 104 may receive, or otherwise obtain, 150 respective configuration information for each of the IoT devices 102. As well, the IDMMS 104 may transmit 152 configuration updates to the IoT devices 102.

In an embodiment, the IDMMS 104 may transmit 154 up to date information regarding the configuration of one or more IoT devices 102 to an IoT device configuration repository (IDCR) 106 for storage. The IDCR 106 may thus serve as an asset management and configuration management repository of all IoT devices 102 in the ecosystem. As discussed in more detail below, the data in the IDCR 106 may be used to train two ML based engines that can predict the security and performance issues in the IoT devices 102 due to uneven patching and software configuration/versioning on the IoT devices 102, as well as identifying IoT devices 102 with a similar configuration mismatch.

C.1.1 Example IDCR

With continued reference to FIG. 1, further details are provided concerning the example IDCR 106. Among other things, the IDCR 106 may store the metadata concerning the software configuration composition, versioning, patching, of one or more of the IoT devices 102. This metadata may be provided 156 to a configuration issues prediction engine (CIPE) 108 and used to train the CIPE 108 to predict any potential security and/or performance issues in one or more of the IoT devices 102.

Typically, the IoT devices 102 have a plethora of software installed with different OS, firmware versions, and security patches. Metadata concerning this software, including software version metadata, received from the IDMMS 104 may be managed by the IDCR 106. Along with the metadata other information including any past issues on security and performance are stored in the IDCR 106. As discussed below, these metadata may be used to one or more other components of an embodiment of the invention. Some example IoT 102 metadata that may be be used to train the next component is shown in the example table 200 of FIG. 2. Note that, in an embodiment, the metadata contained in the table 200 is a subset of all metadata that may be employed in an embodiment, and may not necessarily contain all features needed for a particular training procedure.

As shown, the first six columns, from left to right, may comprise metadata and/or other information that pertains to, or implicates, one or more targets such as, for example, the targets 'performance issues' and/or 'security issues.' Note that as indicated in the example table 200, not every type of metadata necessarily applies to all targets, or to particular targets.

C.1.2 Example CIPE

Figure 3:
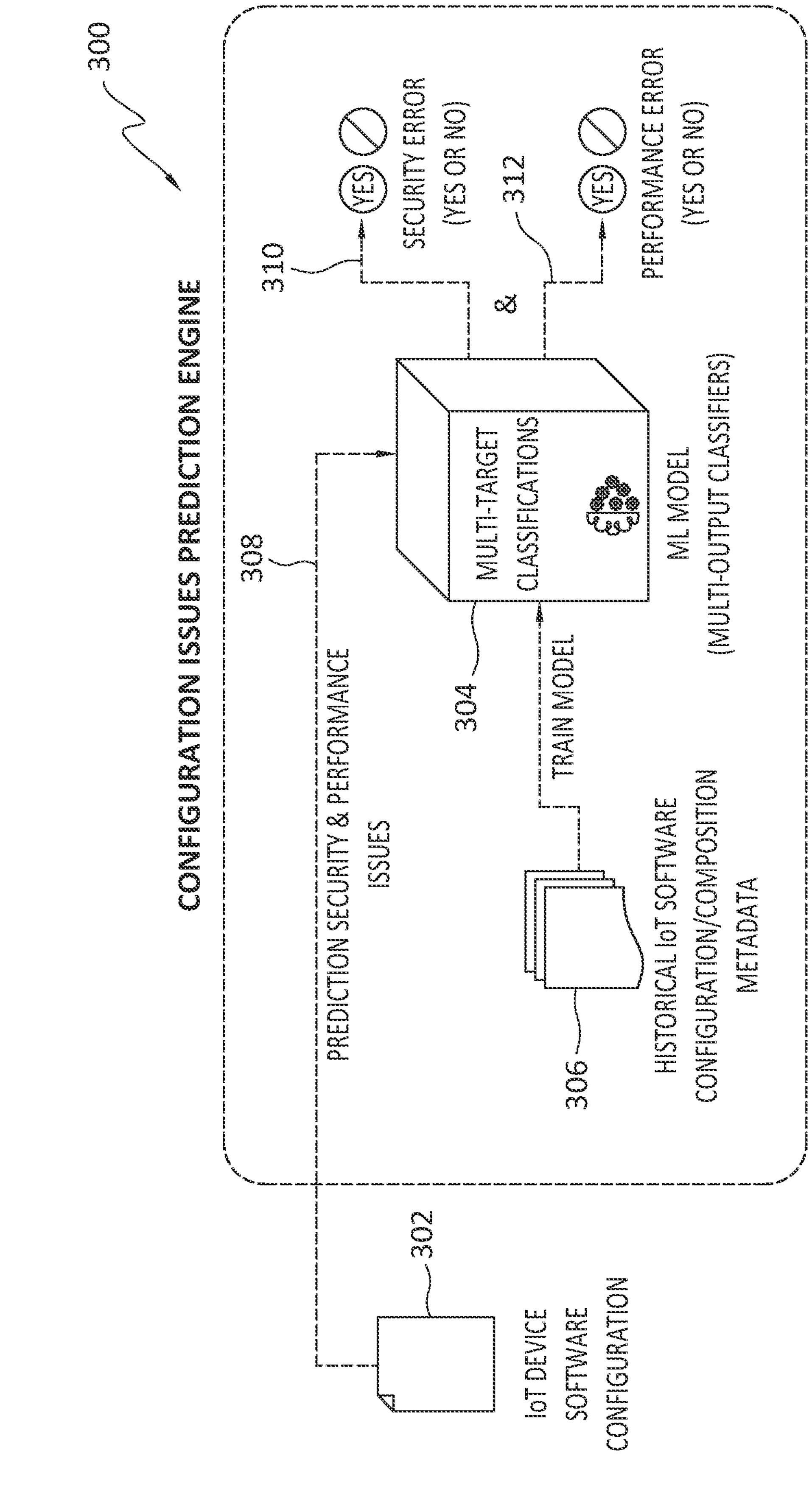
FIG. 3 discloses aspects of a configuration issues prediction engine, and related methods, according to one example embodiment.

With attention now to FIG. 3, further details are provided concerning an example CIPE 300 which may be similar or identical to the CIPE 108 of FIG. 1. In general, the CIPE 300 may operate to make predictions as to possible security issues and/or performance issues that may arise in connection with one or more IoT devices, such as the IoT devices 102 for example.

In more detail, the CIPE 300 may operate to identify if the software configuration 302 of an IoT device may potentially cause any security and/or performance issues or not. The software configuration of an IoT device may comprise various elements such as, but not limited, the combination of software components, type(s) of software components, software component versions, device category/type, device priority in terms of relative importance to other devices, location where the device is installed, and region of the installation. In an embodiment, the generation of predictions in the CIPE 300, such as by an ML model 304 of the CIPE 300, may be achieved by utilizing, as inputs to the model 304, existing IoT device configuration metadata in an enterprise, as well as industry, as a training data set 306, and a leveraging NN (neural network) based multi-output classification algorithm of the model 304 as a binary classifier to predict the two classes, namely, [1] IoT device security issues, and [2] IoT performance issues.

In more detail, the CIPE 300 may leverage a supervised learning mechanism and train the model 304 using, as inputs to the model 304, [1] historical enterprise IoT device software configuration metadata 306, along with [2] the target value 308, which may comprise a threshold for example, indicating whether an IoT device had security and/or performance issues, or not.

Various features, which may comprise data and/or metadata such as disclosed in table 200, that influence a target variable, examples of which include the 'target' in the table 200, may be extracted from a dataset, possibly residing in an IDCR, that includes the various software libraries, both commercial and opensource, along with their versions, and deployment and consumption patterns, for example. A deployment pattern may indicate when and where a particular software package was deployed to one or more IoT devices, and a consumption pattern may indicate an extent to which a deployed software package was used by an IoT device and/or other devices.

During the training, these features may be fed into the model 304 as the independent variables, and the actual value(s) of the two classes, that is, whether or not the software caused security and/or performance issues, as the dependent/target value. On receiving an IoT device software configuration 302, with its software configurations, type, installation and region, the model 304, which may comprise a multi-output classifier-based model, may then operate to predict if an IoT device, given its software configuration, will have potential security and/or performance issues, or not.

In more detail, the example model 304 may utilize a multi-output neural net, a DNN (deep neural network) that has two parallel branches 310 and 312 of network for two types of outputs. By taking the same set of input variables as a single input layer and employing a dense, multi-layer neural network, the model 304 may comprise two parallelized classifiers for multi-output predictions.

Figure 4:
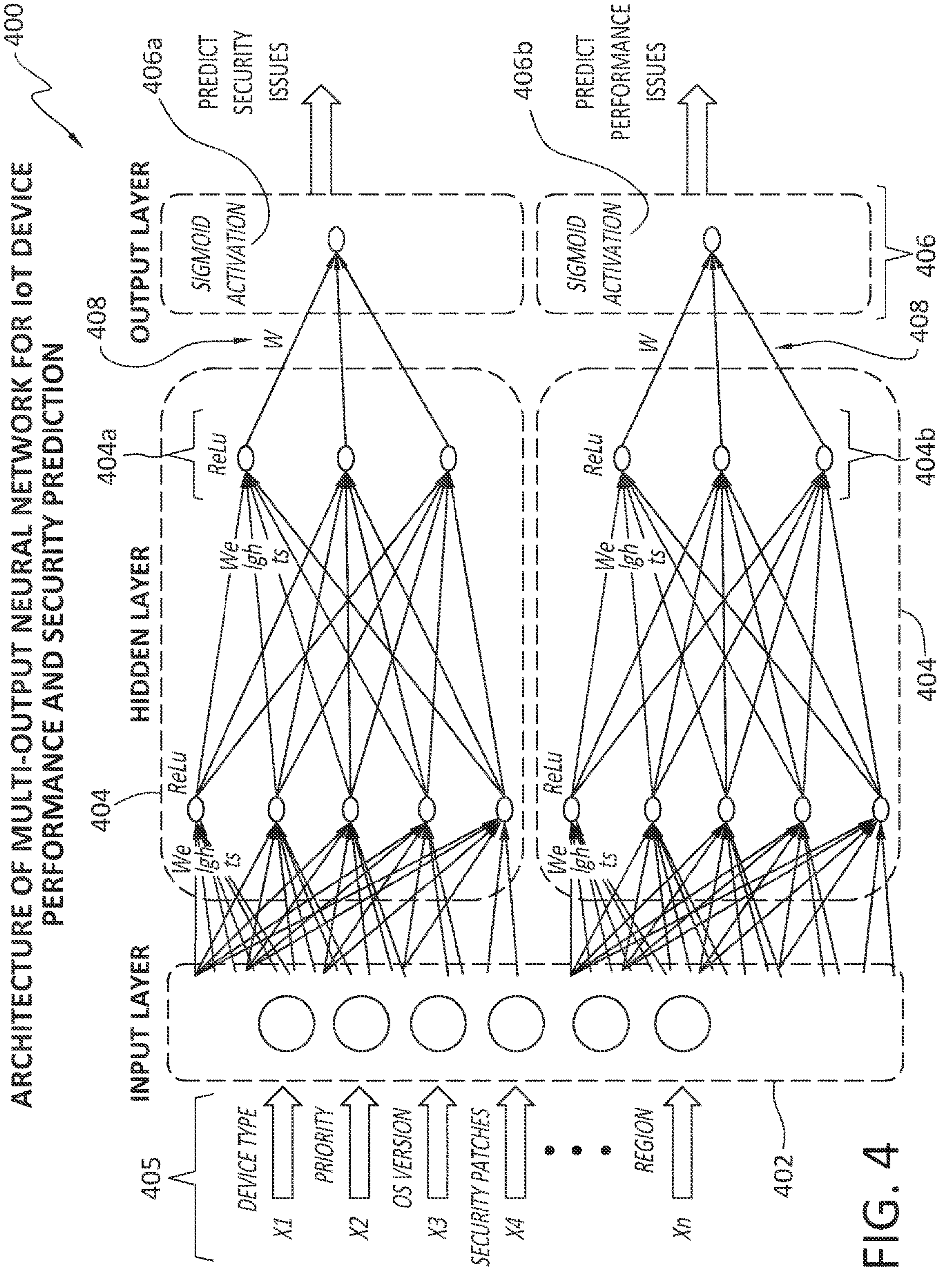
FIG. 4 discloses aspects of an architecture of a multi-output neural network for IoT device performance and security issues prediction, and related methods, according to one example embodiment.

With reference now to FIG. 4, and continued attention to FIG. 3, an example architecture for a model, such as the model 304 for example, is denoted at 400 in FIG. 4. In an embodiment, the architecture 400 comprises an NN that includes an input layer 402, one or more hidden layers 404, and an output layer 406. As a multi-output NN, the architecture 400 may create, or comprise, two separate branches of network, that is, the hidden layer(s) 404 and output layer 406, that connect to the same input layer 402. As shown, inputs 405 provided to the input layer 402 may comprise both IoT software configuration information, such as the 'OS version,' and also various other types of information, which may or may not be historical, such as the 'region' where an IoT device is located.

In an embodiment, the input layer 402 may comprise a number of neurons that matches the number of input/independent variables. An embodiment may comprise two hidden layer(s) 404 and neuron on each hidden layer 404 may depend upon the number of neurons in the input layer 402. The output layer 406 for each branch 408 may comprise a different number of neurons, possibly due to the type of output generated. In the example configuration of FIG. 4, each of the branches 408 may comprise only one neuron. As both the branches 408 operate as classifiers, there may be just one neuron at the output layer 406 with a respective Sigmoid activation function 406*a* for both branches 408, with one branch 408 to predict security errors, while the other branch 408 predicts performance errors. The neurons in the hidden layers 404 may use ReLu activation 404*a* and 404*b*, respectively, for both the branches 408.

D. Aspects of an Example Method for Implementing and Using a CIPE

In an embodiment, a CIPE may be implemented, in the POC (proof of concept) referred to below, by using Keras with Tensorflow backend, Python language, Pandas, Numpy, and ScikitLearn libraries. Following are details concerning the implementation and use of a CIPE according to one example embodiment.

D.1 Data Pre-Processing

A method according to one embodiment may begin with data pre-processing. For example, a dataset of the of the historical IoT device configuration/composition metadata file may be read, and a Pandas data frame generated. The data frame may contain all the columns including independent variables, as well as both the dependent/target variable columns, namely, security issues and performance issues. The initial operation may be to conduct pre-processing of data to handle any null or missing values in the columns. In an embodiment, null/missing values in numerical columns may be replaced by the median value of the values in that column. After performing an initial data analysis by creating univariate and bivariate plots of these columns, the importance and influence of each column may be understood. Columns that have no role or influence on the actual prediction, that is, the target variables of [1] security issues and [2] performance issues, may be dropped. FIG. 5 discloses example code 500 for generating a data frame 502 such as that just described.

D.2 Library Separation

Various libraries used in an embodiment of the invention may be stored in one column, separated by comma. Thus, an embodiment may separate and encode, using the example code 600 in FIG. 6, the libraries 602 using the MultiLabelBinarizer function of the ScikitLearn library.

D.3 Encoding

As ML models according to one or more embodiments of the invention may operate using numerical values, textual categorical values in the columns (see FIG. 6) may be encoded. For example, categorical (textual) values such as 'hosting,' 'user/consumption,' 'security_error,' 'device type,' 'priority,' 'installed location,' 'region,' and 'perf_error' may be encoded as numerical values. In an embodiment, the encoding may be performed using code 700, such as LabelEncoder from ScikitLearn library, which is shown in FIG. 7. Execution of the code 700 may result in the numerical column values indicated in the table 702.

D.4 Dataset Splitting

In an embodiment, a dataset to be used in connection with the generation of predictions as to security issues and/or performance issues may be split into a training dataset, and a testing dataset, using a train_test_split function of ScikitLearn library with 70%-30% split, as shown in the example code 800 of FIG. 8. Since an embodiment may implement multi-target predictions (see table 200 for example targets), it is useful to separate both the target variables from the dataset.

D.5 NN (Neural Network) Model Creation

In an embodiment, a model, such as the model 304 for example, may comprise a multi-layer, multi-output capable, DNN created using the Keras library. In an embodiment, this DNN may be built using the Keras functional model, as separate branches can be created and added to the functional model. In an embodiment, two separate dense layers are added to the input layer, with each network being capable of predicting a different respective target, such as security error and performance error for example. Example code to build an embodiment of the DNN is indicated at 900 in FIG. 9.

A model according to one embodiment may use "adam" as the optimizer and the "binary_crossentropy" as the loss function for both binary classification branches, that is, a branch that indicates either there is a security issue or not, and another branch that indicates either there is a performance issue or not. In an embodiment, the model may be trained with the training independent variables data X_train, and the target variables may be passed for each path, or classification. Example code for the model compile and training is denoted at 1000 in FIG. 10.

D.6 Prediction Generation

Once the model is trained, the model may be directed to predict both target values by passing independent variable values to the predict ( ) of the model. For example, the model may be directed to predict, based on various inputs received by the model, whether or not a security issue is presented by an IoT device configuration, and/or prediction whether or not an IoT device performance issue is presented by an IoT device configuration. Example code for prediction generation is denoted at 1100 in FIG. 11.

E. Further Discussion

As apparent from this disclosure, one or more embodiments of the invention may possess various useful features and aspects. Examples of these are discussed below.

For example, an embodiment may enable IoT device management and governance in an enterprise by capturing the software configuration and composition of an IoT device, or IoT devices, and managing the IoT devices in an IDCR along with any run-time metrics and issues, which may be security and/or performance based, that may have been identified along the way.

As another example, an embodiment may comprise, and leverage, a DNN based multi-class classification machine learning model to predict if an IoT device, given its existing software configuration, may or may not be expected to experience performance and/or security problems. In an embodiment, such insights may enables in planning any updates to the IoT device in advance for maximum durability, and to prevent some problems from occurring in the future.

In a final example, an embodiment may comprise, and leverage, a DNN comprising a multitude of neurons in the input layer where the number of these neurons is the same as the number of influencing variables, multiple hidden layers, and two parallel branches, possibly binary in nature, to predict if the IoT device, based on its configuration, will have vulnerability issues and/or performance issues.

F. Example Methods

Figure 12:
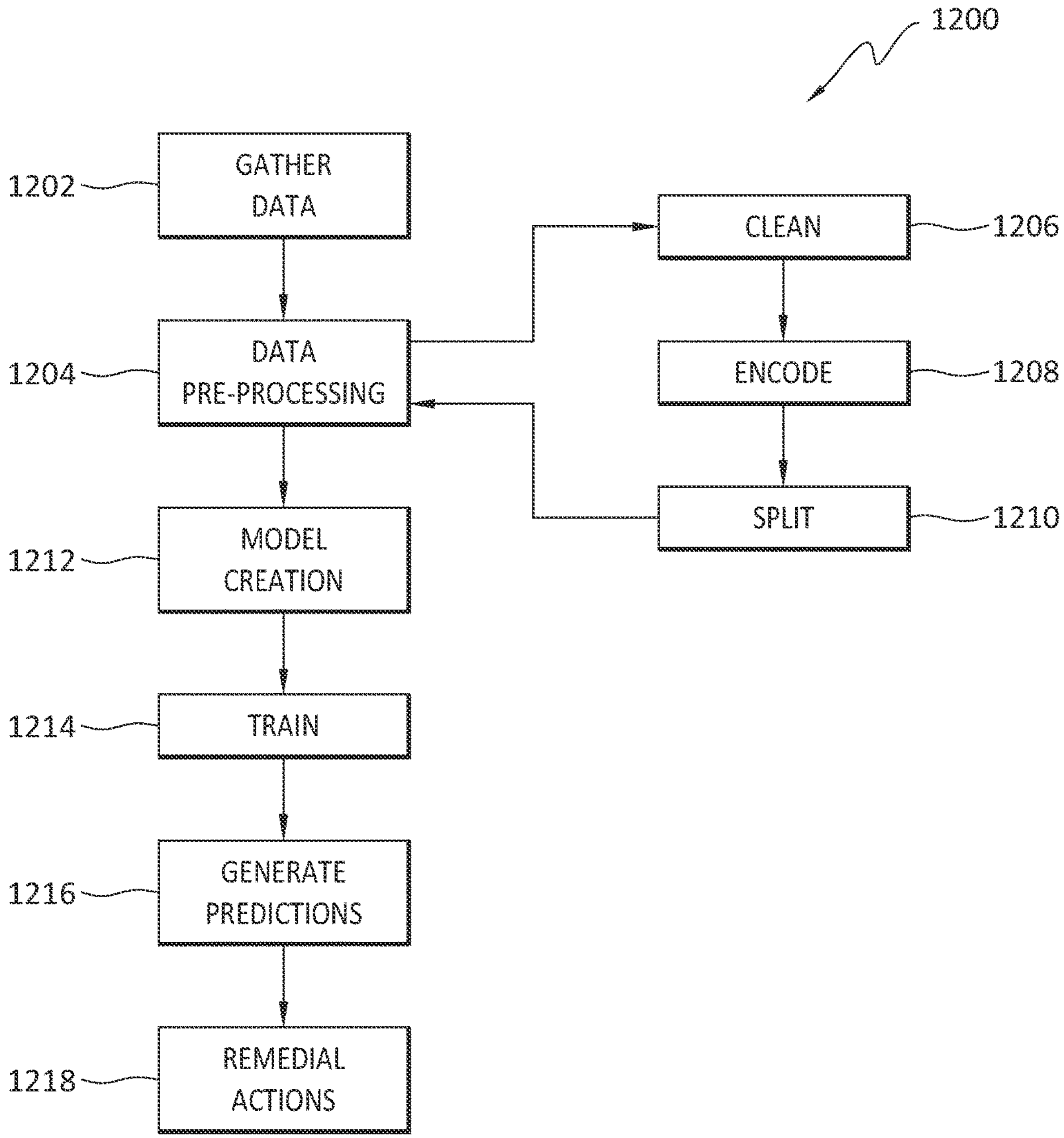
FIG. 12 discloses an example method according to one embodiment.

It is noted with respect to the disclosed methods, including the example method of FIG. 12, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 12, an example method according to one embodiment of the invention is indicated at 1200. Initially, various data, metadata, and/or other information, may be gathered 1202. After the data has been gathered 1202, various data pre-processing operations may be performed 1204 on the data before the data is able to be used for training a prediction model. The Such data pre-processing operations 1204 may comprise, for example, a data cleaning process 1206. In one example embodiment, the data cleaning 1206 may include processing any null, or missing, values in the columns of a dataset. The data cleaning 1206 may also include performing data analysis to determine the respective importance and influence of each of the columns of the dataset. Columns will little or no role or influence may be dropped from the dataset.

Another data pre-processing operation 1204 may be a data encoding process 1208. In general, and as noted elsewhere herein, a data encoding process 1208 may convert textual values in the columns of the dataset, such as textual categorical values, to numerical values that can be understood, and employed, by the model.

A final example of a data pre-processing operation 1204 is a dataset splitting operation 1210. In an embodiment, a dataset splitting operation 1210 may serve to separate target values from the dataset.

After, or before, the data pre-processing 1204 has been performed, a model may be created 1212 that is configured, and operable, to make respective target value predictions for each target in a group of targets. As noted elsewhere herein, in an embodiment, the targets may respectively correspond to an IoT security issue, and an IoT performance issue.

After the model has been created 1212, it may be trained 1214 using the pre-processed data. Once trained 1214, the model is then able to generate target value predictions 1216 for one or more targets, or issues, of an IoT. After the target value predictions have been made 1216, any necessary remedial actions may be taken 1218. For example, if a target value prediction indicates that, due to its current software configuration, an IoT device can be expected to experience a security issue, the IoT device software configuration may be modified to eliminate the potential security issue. As another example, if a target value prediction indicates that, due to its current software configuration, an IoT device can be expected to experience a performance issue, the IoT device software configuration may be modified to eliminate the potential performance issue. Example software configuration changes that may be implemented to remedy a potential issue, whether performance and/or security, are disclosed elsewhere herein and may include, for example, updating a software version on the IoT device, or adding a security patch to the IoT device.

In an embodiment, one or the other, or both, of a security issue and a performance issue may be predicted for a given IoT device. In some instances, neither a security issue nor a performance issue may be predicted for a given IoT device. That is, an issue is not necessarily predicted for an IoT device in any given circumstances. At one or more times, and for various IoT devices, one or more issues may, or may not, be predicted. In an embodiment, where no issue is predicted for an IoT device, the software configuration of that IoT device may be used as a guide for implementing changes to the software configurations of IoT devices for which an issue has been predicted.

G. Further Example Embodiments

Following are some further example embodiments of the invention. These are presented only by way of example and are not intended to limit the scope of the invention in any way.

Embodiment 1. A method, comprising: pre-processing a dataset, wherein the dataset includes data and/or metadata that indicates a software configuration of an internet of things (IoT) device, and/or indicates a history of any performance issues and/or security issues experienced by the IoT device; after the dataset is pre-processed, providing the dataset as an input to a machine learning model; using the machine learning model to generate, based on the input, respective target variable value predictions for each target variable in a group of target variables, and a first one of the target variables corresponds to the software configuration, and a second one of the target variables corresponds to the history; and when the target variable value predictions indicate a potential security issue and/or a potential performance issue, with the IoT device, taking a remedial action to resolve the potential security issue and/or the potential performance issue.

Embodiment 2. The method as recited in any preceding embodiment, wherein the machine learning model comprises a multi-output neural network that includes multiple parallel branches, and each of the branches corresponds to a respective one of the target variables.

Embodiment 3. The method as recited in any preceding embodiment, wherein the model performs a respective softmax activation to obtain each of the predicted target values.

Embodiment 4. The method as recited in any preceding embodiment, wherein the input is received by the model through a single input layer of the model.

Embodiment 5. The method as recited in any preceding embodiment, wherein the pre-processing comprises separating the target variables from other elements of the dataset.

Embodiment 6. The method as recited in any preceding embodiment, wherein the IoT device comprises an internet of medical things (IoMT) device.

Embodiment 7. The method as recited in any preceding embodiment, wherein an alert is generated and transmitted when the target variable value predictions indicate a potential security issue and/or a potential performance issue.

Embodiment 8. The method as recited in any preceding embodiment, wherein the software configuration comprises any one or more of an operating system (OS) of the IoT device, version information about software on the IoT device, and/or a combination of software on the IoT device.

Embodiment 9. The method as recited in any preceding embodiment, wherein the model comprises a deep neural network comprising an input layer with multiple neurons, and each of the neurons corresponds to a respective influencing variable.

Embodiment 10. The method as recited in any preceding embodiment, wherein the model comprises a deep neural network comprising multiple hidden layers, and well as two parallel output branches that communicate with the multiple hidden layers, and each of the output branches corresponds to a respective one of the target variables.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

H. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 13:
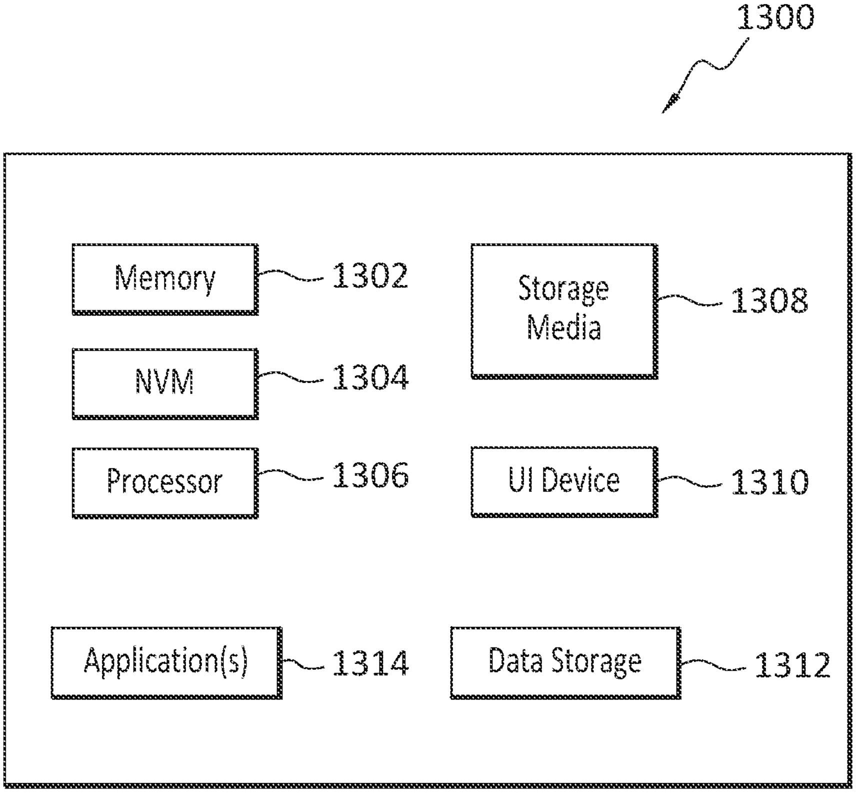
FIG. 13 discloses an example computing entity configured and operable to perform any of the disclosed methods, processes, and operations.

With reference briefly now to FIG. 13, any one or more of the entities disclosed, or implied, by FIGS. 1-12, and/or elsewhere herein, may take the form of, or include, or be implemented on, or hosted by, a physical computing device, one example of which is denoted at 1300. As well, where any of the aforementioned elements comprise or consist of a virtual machine (VM), that VM may constitute a virtualization of any combination of the physical components disclosed in FIG. 13.

In the example of FIG. 13, the physical computing device 1300 includes a memory 1302 which may include one, some, or all, of random access memory (RAM), non-volatile memory (NVM) 1304 such as NVRAM for example, read-only memory (ROM), and persistent memory, one or more hardware processors 1306, non-transitory storage media 1308, UI device 1310, and data storage 1312. One or more of the memory components 1302 of the physical computing device 1300 may take the form of solid state device (SSD) storage. As well, one or more applications 1314 may be provided that comprise instructions executable by one or more hardware processors 1306 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

pre-processing a dataset maintained in a centralized device component repository, the dataset including, for each of a plurality of internet of things (IoT) devices: (i) software configuration metadata indicating an operating system, software version information, patch information, and software libraries, and (ii) historical data indicating whether security issues and performance issues were previously experienced by the IoT device, wherein the centralized device component repository maintains current versioning of the software configuration metadata such that, after remedial actions are performed on an IoT device, the dataset is updated;

separating, during said pre-processing, independent variables corresponding to the software configuration metadata from dependent variables corresponding to security issues and performance issues;

after the dataset is pre-processed, providing the independent variables as an input to a machine learning model;

training the machine learning model using the independent variables and corresponding dependent variables, wherein the machine learning model comprises a multi-output classification model configured to generate: (a) a first output indicating whether a software configuration is predicted to be associated with a security issue and (b) a second output indicating whether the software configuration is predicted to be associated with a performance issue;

after training, providing the independent variables derived from the software configuration metadata to the trained machine learning model;

using the machine learning model to generate output predictions indicating a likelihood of a security issue and a likelihood of a performance issue for an IoT device based on the provided independent variables; and when the output predictions indicate both a potential security issue and a potential performance issue for the IoT device, taking a remedial action to resolve the potential security issue and the potential performance issue based on a combination of the software configuration and any patches thereto used in the IoT device.

2. The method as recited in claim 1, wherein the machine learning model comprises a multi-output neural network that includes multiple parallel branches, and each of the multiple parallel branches corresponds to a respective one of the independent variables.

3. The method as recited in claim 1, wherein the machine learning model performs a respective softmax activation to obtain each of the output predictions.

4. The method as recited in claim 1, wherein the input is received by the machine learning model through a single input layer of the machine learning model.

5. The method as recited in claim 1, wherein the pre-processing comprises separating the independent variables from other elements of the dataset.

6. The method as recited in claim 1, wherein each IoT device comprises an internet of medical things (IoMT) device.

7. The method as recited in claim 1, wherein an alert is generated and transmitted when the output predictions indicate a potential security issue and a potential performance issue.

8. The method as recited in claim 1, wherein the software configuration comprises any one or more of an operating system (OS) of each IoT device, version information about software on each IoT device, and a combination of software on each IoT device.

9. The method as recited in claim 1, wherein the machine learning model comprises a deep neural network comprising an input layer with multiple neurons, and each of the neurons corresponds to a respective influencing variable.

10. The method as recited in claim 1, wherein the machine learning model comprises a deep neural network comprising multiple hidden layers, and as well as two parallel output branches that communicate with the multiple hidden layers, and each of the two parallel output branches corresponds to a respective one of the independent variables.

11. A non-transitory storage medium having stored therein instructions that are executable by one or more hardware processors to perform operations comprising:

pre-processing a dataset maintained in a centralized device component repository, the dataset including, for each of a plurality of internet of things (IoT) devices: (i) software configuration metadata indicating an operating system, software version information, patch information, and software libraries, and (ii) historical data indicating whether security issues and performance issues were previously experienced by the IoT device, wherein the centralized device component repository maintains current versioning of the software configuration metadata such that, after remedial actions are performed on an IoT device, the dataset is updated;

separating, during said pre-processing, independent variables corresponding to the software configuration metadata from dependent variables corresponding to security issues and performance issues;

after the dataset is pre-processed, providing the independent variables as an input to a machine learning model;

training the machine learning model using the independent variables and corresponding dependent variables, wherein the machine learning model comprises a multi-output classification model configured to generate: (a) a first output indicating whether a software configuration is predicted to be associated with a security issue and (b) a second output indicating whether the software configuration is predicted to be associated with a performance issue;

after training, providing the independent variables derived from the software configuration metadata to the trained machine learning model;

using the machine learning model to generate output predictions indicating a likelihood of a security issue and a likelihood of a performance issue for an IoT device based on the provided independent variables; and when the output predictions indicate both a potential security issue and a potential performance issue for the IoT device, taking a remedial action to resolve the potential security issue and the potential performance issue based on a combination of the software configuration and any patches thereto used in the IoT device.

12. The non-transitory storage medium as recited in claim 11, wherein the machine learning model comprises a multi-output neural network that includes multiple parallel branches, and each of the multiple parallel branches corresponds to a respective one of the independent variables.

13. The non-transitory storage medium as recited in claim 11, wherein the machine learning model performs a respective softmax activation to obtain each of the output predictions.

14. The non-transitory storage medium as recited in claim 11, wherein the input is received by the machine learning model through a single input layer of the machine learning model.

15. The non-transitory storage medium as recited in claim 11, wherein the pre-processing comprises separating the independent variables from other elements of the dataset.

16. The non-transitory storage medium as recited in claim 11, wherein each IoT device IoT device comprises an internet of medical things (IoMT) device.

17. The non-transitory storage medium as recited in claim 11, wherein an alert is generated and transmitted when the output predictions indicate a potential security issue and a potential performance issue.

18. The non-transitory storage medium as recited in claim 11, wherein the software configuration comprises any one or more of an operating system (OS) of each IoT device IoT device, version information about software on each IoT device IoT device, and a combination of software on each IoT device IoT device.

19. The non-transitory storage medium as recited in claim 11, wherein the machine learning model comprises a deep neural network comprising an input layer with multiple neurons, and each of the neurons corresponds to a respective influencing variable.

20. The non-transitory storage medium as recited in claim 11, wherein the model comprises a deep neural network comprising multiple hidden layers, and as well as two parallel output branches that communicate with the multiple hidden layers, and each of the two parallel output branches corresponds to a respective one of the independent variables.

* * * * *